United States Patent
Weinholt et al.

(10) Patent No.: US 9,479,269 B2
(45) Date of Patent: Oct. 25, 2016

(54) TRANSMITTER HAVING AN EMBEDDED ZERO AMPLITUDE DIFFERENTIAL PHASE TRACKING SIGNAL AND CORRESPONDING RECEIVER

(75) Inventors: Dan Weinholt, Västra Frölunda (SE); Mats Rydström, Billdal (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 43 days.

(21) Appl. No.: 14/344,922

(22) PCT Filed: Sep. 28, 2011

(86) PCT No.: PCT/EP2011/066874
§ 371 (c)(1),
(2), (4) Date: Mar. 14, 2014

(87) PCT Pub. No.: WO2013/044949
PCT Pub. Date: Apr. 4, 2013

(65) Prior Publication Data
US 2014/0241460 A1    Aug. 28, 2014

(51) Int. Cl.
*H04B 15/00* (2006.01)
*H04B 7/06* (2006.01)
*H04B 7/08* (2006.01)
*H04B 7/04* (2006.01)

(52) U.S. Cl.
CPC ............ *H04B 15/00* (2013.01); *H04B 7/0413* (2013.01); *H04B 7/0665* (2013.01); *H04B 7/084* (2013.01); *H04B 2215/00* (2013.01)

(58) Field of Classification Search
CPC ............... H04L 27/2675; H04L 2027/0067; H04B 10/532; H04B 10/6165; H04B 15/00
USPC ......... 375/260, 267, 346; 370/311, 522, 527
See application file for complete search history.

(56) References Cited

U.S. PATENT DOCUMENTS

| | | | |
|---|---|---|---|
| 5,697,084 A | 12/1997 | Tingley | |
| 6,285,663 B1* | 9/2001 | Esmailzadeh | H04W 52/60 370/311 |
| 7,551,678 B2* | 6/2009 | Kiyanagii | H04B 7/10 375/260 |
| 7,573,398 B2 | 8/2009 | Hoctor et al. | |
| 2008/0101497 A1* | 5/2008 | Gaikwad | H04B 7/0413 375/267 |
| 2010/0290552 A1* | 11/2010 | Sasaki | H04B 7/0413 375/267 |
| 2011/0182344 A1* | 7/2011 | Rosenhouse | H04B 17/345 375/224 |

FOREIGN PATENT DOCUMENTS

| | | |
|---|---|---|
| EP | 1788714 A2 | 5/2007 |
| WO | 9962205 A1 | 12/1999 |
| WO | 2006037241 A1 | 4/2006 |
| WO | 2012048723 A1 | 4/2012 |

* cited by examiner

Primary Examiner — Daniel Washburn
Assistant Examiner — Eboni Hughes
(74) Attorney, Agent, or Firm — Coats & Bennett, PLLC (57) ABSTRACT

Example embodiments presented herein are directed towards a system, and corresponding method, for interference suppression of wireless communication signals. The method may comprise embedding a differential phase tracking signal (e.g., a zero amplitude differential phase tracking signal) in a transmitted wireless communication signal. Thereafter, a differential phase may be measured between the embedded transmitted wireless communication signal and a wireless reference signal. This differential phase measurement may be utilized in the suppression of interference in the wireless communication signal.

24 Claims, 9 Drawing Sheets

TRANSMITTER HAVING AN EMBEDDED ZERO AMPLITUDE DIFFERENTIAL PHASE TRACKING SIGNAL AND CORRESPONDING RECEIVER

TECHNICAL FIELD

Some example embodiments presented herein are directed towards a method in a transmitter and receiver for interference suppression of wireless communication signals.

BACKGROUND

In multi-antenna systems, for example cross-polar interference cancellation (XPIC) systems and multiple-input multiple-output (MIMO) systems, the receiver typically needs accurate knowledge of the propagation channel between the transmitter and receiver in order to be able to decode transmitted data without an excessive amount of errors. In systems where radio frequency (RF) signals received by different antennas are down-converted using independent oscillators, phase noise from the various oscillators distorts the received signals. In an attempt to reduce oscillator phase noise, present highly spectral efficient communication systems rely on local oscillators with low phase noise. Other highly spectral efficient communication systems rely on the use of a common down converting oscillator for multiple receivers.

SUMMARY

Various problems exist with the present phase noise solutions. An example of such a problem is that local oscillators with low phase noise are typically very expensive in terms of production and power consumption and may greatly increase the cost of service. Another example is common oscillators with an output that must be available at both receivers; therefore mechanical constraints are placed on the design of the receivers which may again increase the cost of the system.

Thus, at least one object of the example embodiments presented herein may be to provide an efficient multi-antenna system. Therefore, some example embodiments may be directed towards a method in a transmitter for interference suppression of wireless communication signals. The method may comprise embedding a zero amplitude differential phase tracking signal, utilized for interference suppression, in a wireless communication signal, where the embedding is performed in a known pattern. The method may also comprise sending the wireless communication signal, comprising the embedded differential phase tracking signal, to a receiver.

Some example embodiments may be directed towards a transmitter for sending wireless communication signals. The transmitter may comprise an embedding unit configured to embed a zero amplitude differential phase tracking signal, utilized for interference cancellation, in a wireless communication signal, where the embedding unit is further configured to embed the zero amplitude differential phase tracking signal in a predetermined rate. The transmitter may further comprise a communications port configured to send the wireless communications signal, comprising the embedded zero amplitude differential phase tracking signal, to a receiver.

Some example embodiments may be directed towards a method in a receiver for interference suppression of wireless signals. The method may comprise receiving a wireless communication signal, the wireless communication signal comprising an embedded differential phase tracking signal. The method may also comprise receiving a wireless reference signal, the wireless reference signal being distinct from the wireless communication signal. The method may further comprise adjusting an estimate of a differential phase angle between two receiver oscillators based on a differential phase angle measurement between the wireless communication signal and the wireless reference signal, and suppressing interference in the wireless communication signal using the wireless reference signal and said estimate of the differential phase angle.

Some example embodiments may be directed towards a receiver configured to receive wireless communication signals. The receiver may comprise a first communications port configured to receive a wireless communication signal, the wireless communication signal comprising an embedded differential phase tracking signal. The receiver may also comprise a second communications port configured to receive a wireless reference signal, the wireless reference signal being distinct from the wireless communication signal. The receiver may further comprise an adjustment unit configured to adjust an estimate of a differential phase angle between two receiver oscillators based on a differential phase angle measurement between the wireless communication signal and the wireless reference signal. The receiver may also comprise a suppression unit configured to suppress interference in the wireless communication signal using the wireless reference signal and said estimate of the different phase angle.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1:
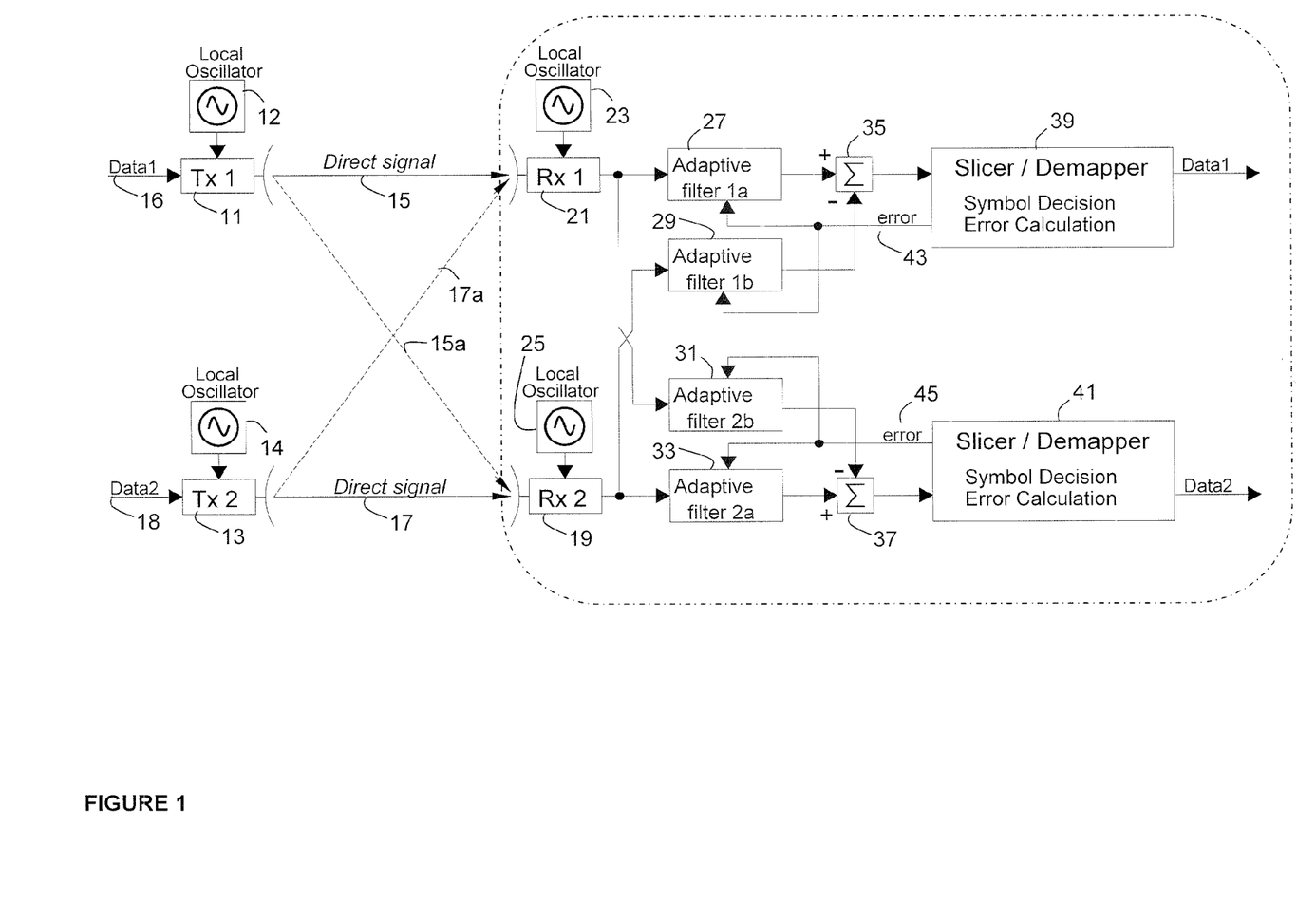
FIG. 1 is a schematic of a general MIMO system employing a cancelling technique to separate incoming signals.

FIG. 1 illustrates an example of a general multiple-input multiple-output (MIMO) system. The system of FIG. 1 may comprise any number of transmitters, for example TX1 11 and TX2 13. The transmitters 11 and 13 may be configured to send wireless signals 16 and 18, respectively. The transmitters 11 and 13 may comprise local oscillators 12 and 14, respectively, for the up-conversion of the transmitted signals 15 and 17, respectively.

The transmitters 11 and 13 may send the wireless signals 15 and 17 to a receiver 20. The receiver 20 may comprise receiver ports 19 and 21 which may be configured to receive the wireless signals 15 and 17, respectively. It should be appreciated that in addition to the transmitted signals 15 and 17, the receiver ports 19 and 21 may also receive interference in the form of cross signals 17a and 15a, respectively.

Figure 2:
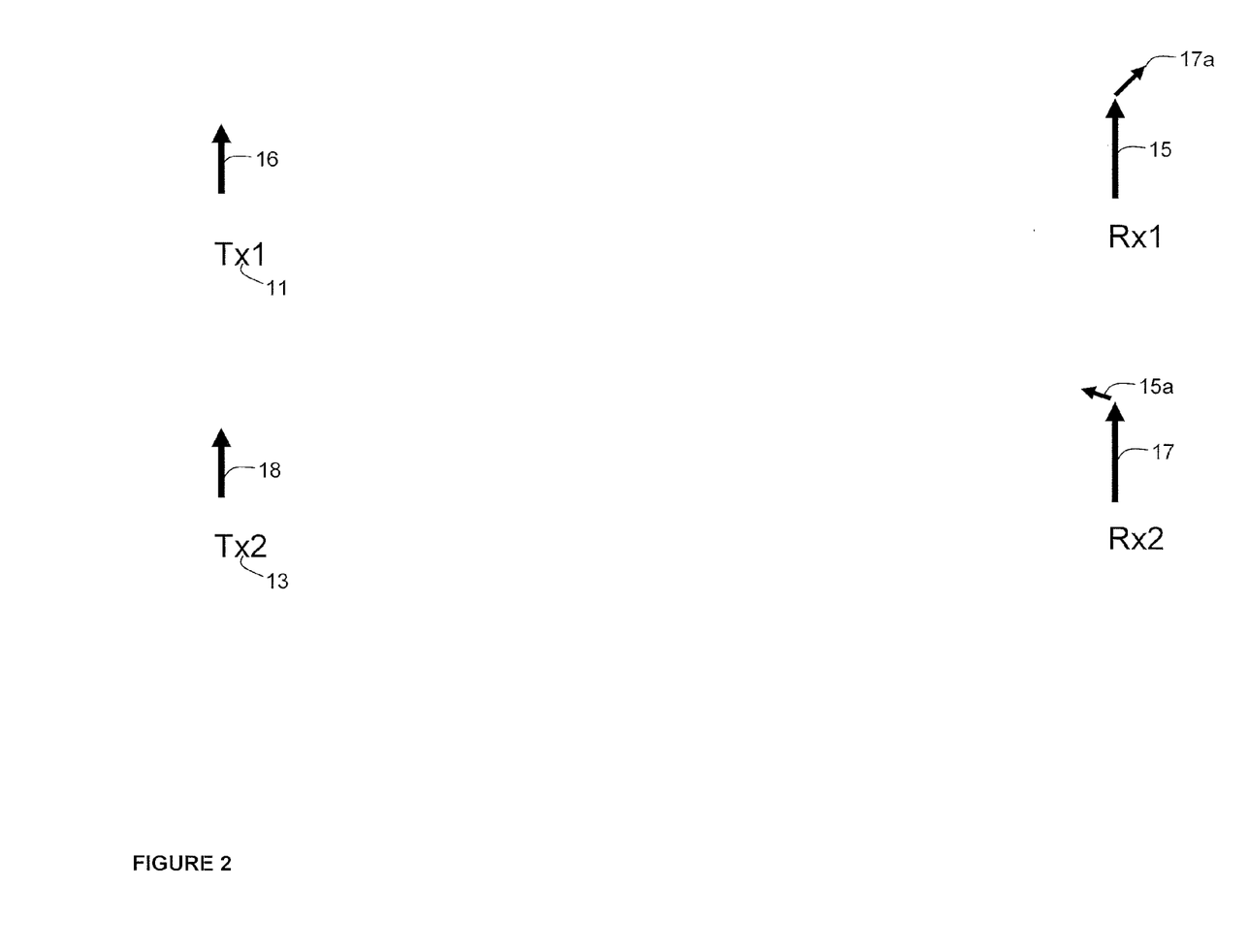
FIG. 2 is an illustrative example of signals which may be received by the system of FIG. 1.

FIG. 2 illustrates a phase and amplitude representation of the transmitted and received signals of FIG. 1. As shown on the left-hand side of FIG. 2, transmitters 11 and 13 may transmit signals 11 and 13, respectively. Corresponding receiver ports RX1 19 and RX2 21 may be configured to receive the transmitted signals 15 and 17, respectively. Due to cross-talk, receiver port 19 may also receive an interference signal 17a originating from transmitter 13. Similarly, receiver port 21 may receive an interference signal 15a originating from transmitter 11. The interference signals 15a and 17a may be out of phase and comprise a different amplitude with respect to the received signals 17 and 15, respectively.

The receiver system of FIG. 1 comprises various hardware components configured to remove the interference components 17a and 15a of the received signals.

First, the signal received at each receiver port 19 and 21 is filtered. The signal received at port 19 is filtered via adaptive filter 27, located in the processing logic associated with receiver port 19, and adaptive filter 29, located in the processing logic associated with receiver port 21. The signal received at port 21 is filtered via adaptive filter 31, located in the processing logic associated with receiver port 19, and adaptive filter 33, located in the processing logic associated with receiver port 21.

Upon filtering, the signals are then combined with combiners 35 and 37. Specifically, utilizing combiner 35, the filtered signal from adaptive filter 27 is added with a filtered signal from adaptive filter 29. Utilizing combiner 37, the filtered signal from adaptive filter 33 is added to a filtered signal from adaptive filter 31. During the signal combination, the interference component may be suppressed. In the suppression of the interference components a differential phase angle between the two receiver oscillators 23 and 25 should be determined a priori.

The combined signals are thereafter sent to demappers 39 and 41, associated with receiver ports 19 and 21, respectively. A demapper may be configured to convert signals to symbol decisions. The symbol decision may be combined with the filtered and combined signals to form error signals 43 and 45 which may be used to adjust the filter coefficients associated with receiver ports 19 and 21, respectively.

The cancellation of interference described above typically requires the use of local oscillators, e.g., oscillators 12, 14, 23, and 25, with low phase noise in order to accurately determine the phase difference between the two receiver oscillators 23 and 25. Oscillators such as these are expensive in terms of production and power consumption and result in an increase in the cost of providing service. Signal processing methods for tracking phase differences of the oscillators also exist (e.g., correlation and joint detection based approaches). However, such phase tracking methods place constraints on the receiver system, such as increased complexity, and may reduce system performance.

Thus, at least one object of the example embodiments presented herein may be to provide an efficient multi-antenna system with reduced interference. The technical effect of such an object may be to provide a multi-antenna system with phase tracking capabilities for highly spectral efficient communications without the need for high performance local oscillators or complicated signal processing.

Figure 3:
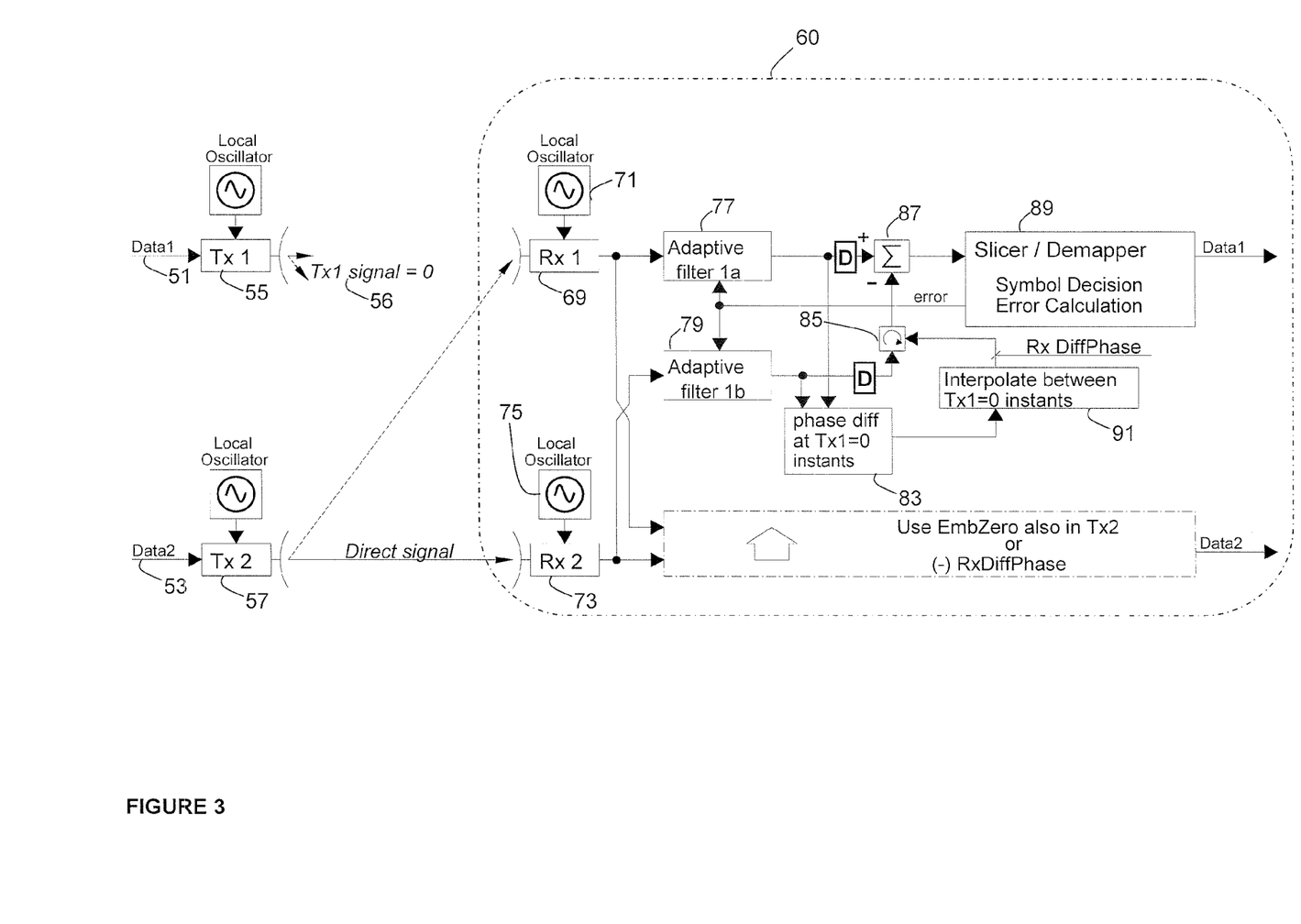
FIG. 3 is a schematic of a MIMO system according to some of the example embodiments.
Figure 4:
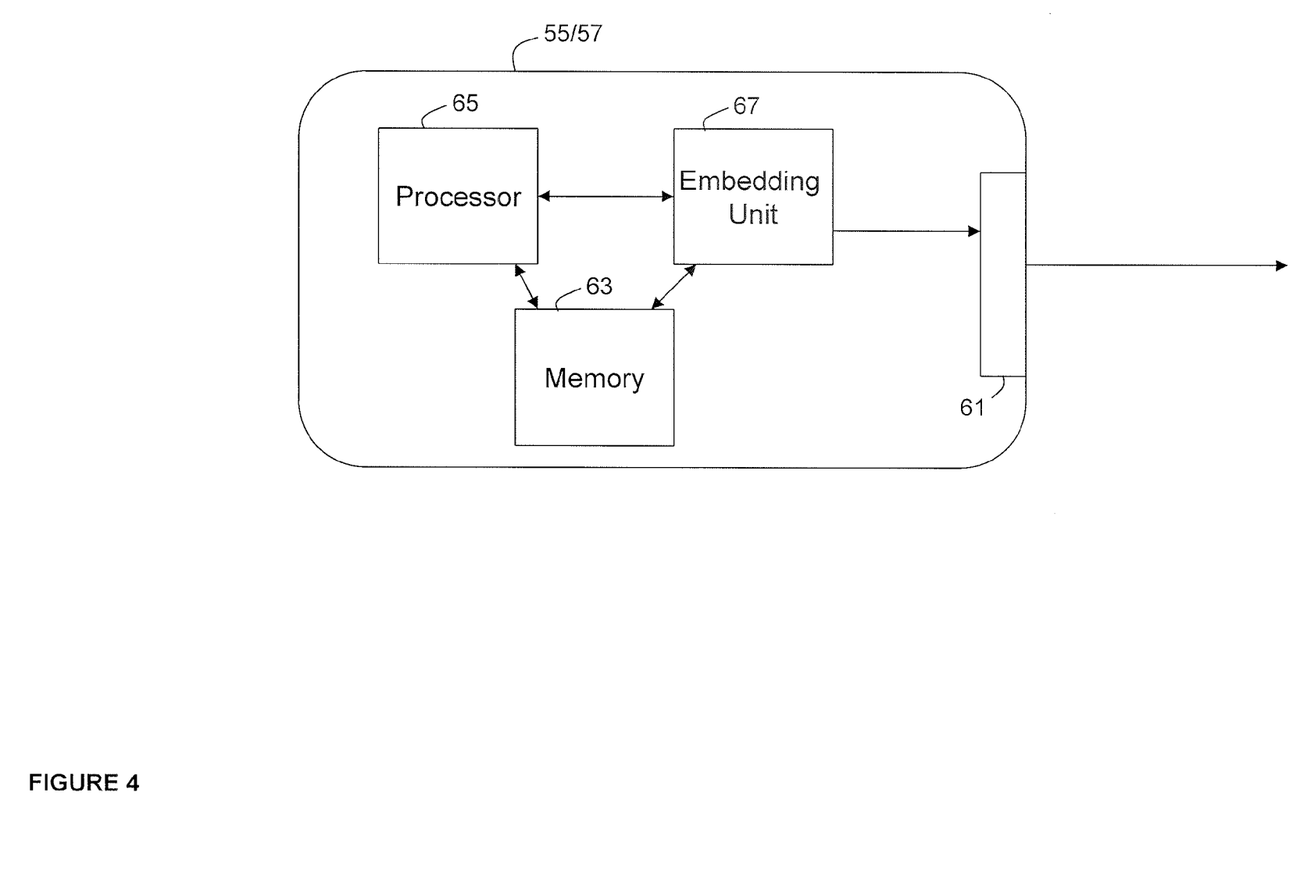
FIG. 4 is a block diagram depicting an example of a transmitter from the system illustrated in FIG. 3, according to some of the example embodiments.

FIG. 3 illustrates a multi-antenna system which may utilize the example embodiments discussed herein. FIG. 4 is a schematic of the transmitter featured in FIG. 3. The multi-antenna system may comprise at least two transmitters, for example, transmitters 55 and 57.

As shown in FIG. 4 the transmitters 55 and 57 may comprise a communications port 61, which may be able to transmit or receive any number or type of wireless signals. The wireless signals may be in the form of communication signals and/or control signals. It should be appreciated that the communications port may be in the form of separate receiving and transmitting units. It should further be appreciated that the communications port may be in the form of any communications port known in the art.

The transmitter 55 and/or 57 may further comprise at least one memory unit 63 that may be in communication with the communications port 61. The memory unit 63 may be configured to store received, transmitted, and/or measured data and/or executable program instructions. The memory unit 63 may be any suitable type of computer readable memory and may be of volatile and/or non-volatile type.

The transmitter 55 and/or 57 may further comprise a processor 65. The transmitter 55 and/or 57 may also comprise an embedding unit 67. The embedding unit may be configured to embed a wireless signal with a zero amplitude differential phase tracking signal 56. The processor 65 and/or embedding unit 67 may be any suitable type of computation unit, e.g. a microprocessor, digital signal processor (DSP), field programmable gate array (FPGA), or application specific integrated circuit (ASIC). It should further be appreciated that the processor 65 and embedding unit 67 need not be comprised as separate units.

The multi-antenna system of FIG. 3 may also comprise a receiver 60. The receiver 60 may comprise a first 69 and a second 73 receiver port. The receiver ports may be configured to receive any form of communication data or control signals. Each receiver port 69 and 73 of the receiver 60 may further comprise a local oscillator 71 and 75, respectively.

The receiver 60 may further comprise adaptive filters 77 and 79. The adaptive filters 77 and 79 may be configured to filter received communications from receiver ports 69 and 73, respectively. The adaptive filters 77 and 79 may be in communication with an adjustment unit 83. The adjustment unit 83 may be configured to adjust an estimation of a differential phase between the local oscillators 71 and 75.

The receiver 60 may also comprise a rotating element 85 that may be configured to rotate the phase of a filtered incoming signal. The receiver 60 may also comprise a suppression unit 87 that may be configured to suppress an interference component of the incoming wireless signals. The receiver may further comprise a demapper 89 that may be configured to send an error signal to adjust the filters 77 and 79. The receiver 60 may further comprise delay elements D which enable the use of an interpolated differential phase. The receiver 60 may further comprise an interpolation unit 91 that may be configured to interpolate an estimate of the differential phase between the local oscillators 71 and 75.

Although not shown in FIG. 3, it should be appreciated that the receiver 60 may also comprise a general processing unit. The processing unit, adjustment unit 83, the suppression unit 87, and/or the interpolation unit 91 may be any suitable type of computation unit, e.g. a microprocessor, digital signal processor (DSP), field programmable gate array (FPGA), or application specific integrated circuit (ASIC). It should further be appreciated that the processing unit, adjustment unit 83, the suppression unit 87, and/or the interpolation unit 91 need not be comprised as separate units. It should be appreciated that the physical components of the receiver 60 need not be in mechanical connection with one another. Nor do the physical components of receiver 60 have to be in close proximity to one another.

Figure 5:
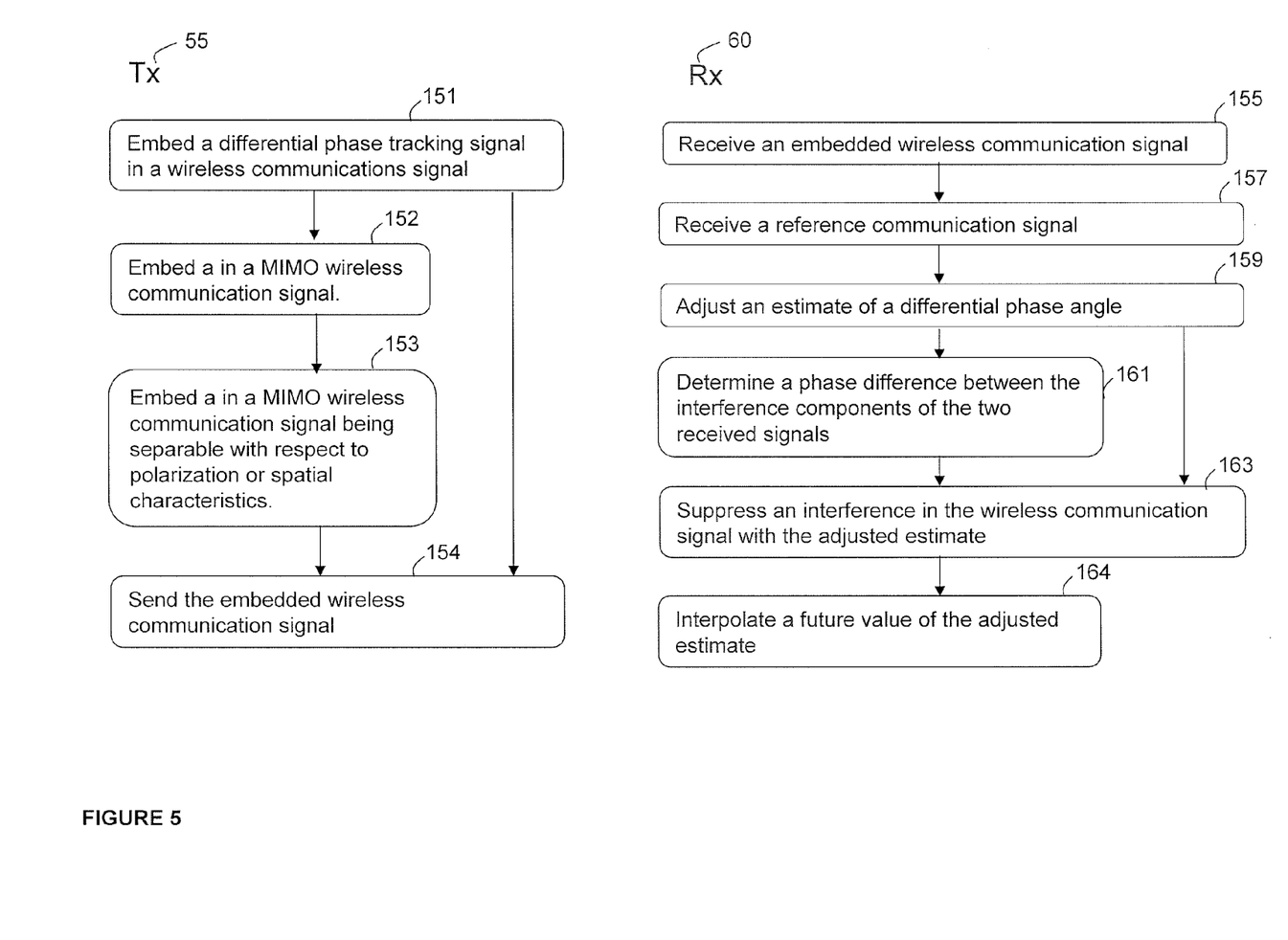
FIG. 5 is a flow chart depicting example operations which may be taken by the system of FIG. 3, according to some example embodiments.

FIG. 5 is a flow diagram depicting example operations which may be performed by the system of FIG. 3.

Operation 151:

Example operations, in the transmitter 55, may comprise embedding 151 a differential phase tracking signal 56 (e.g., with a zero amplitude), utilized for interference suppression, in a wireless communication signal 51, with the embedding being performed in a known pattern. The processor 65 and/or the embedding unit 67 of transmitter 55 or 57 may be configured to embed the zero amplitude differential phase tracking signal 56. The processor 65 and/or embedding unit 67 may be further configured to embed the zero amplitude differential phase tracking signal 56 in a predetermined rate or known pattern. The embedding may result in a zero amplitude signal being transmitted from transmitter 55.

Figure 6:
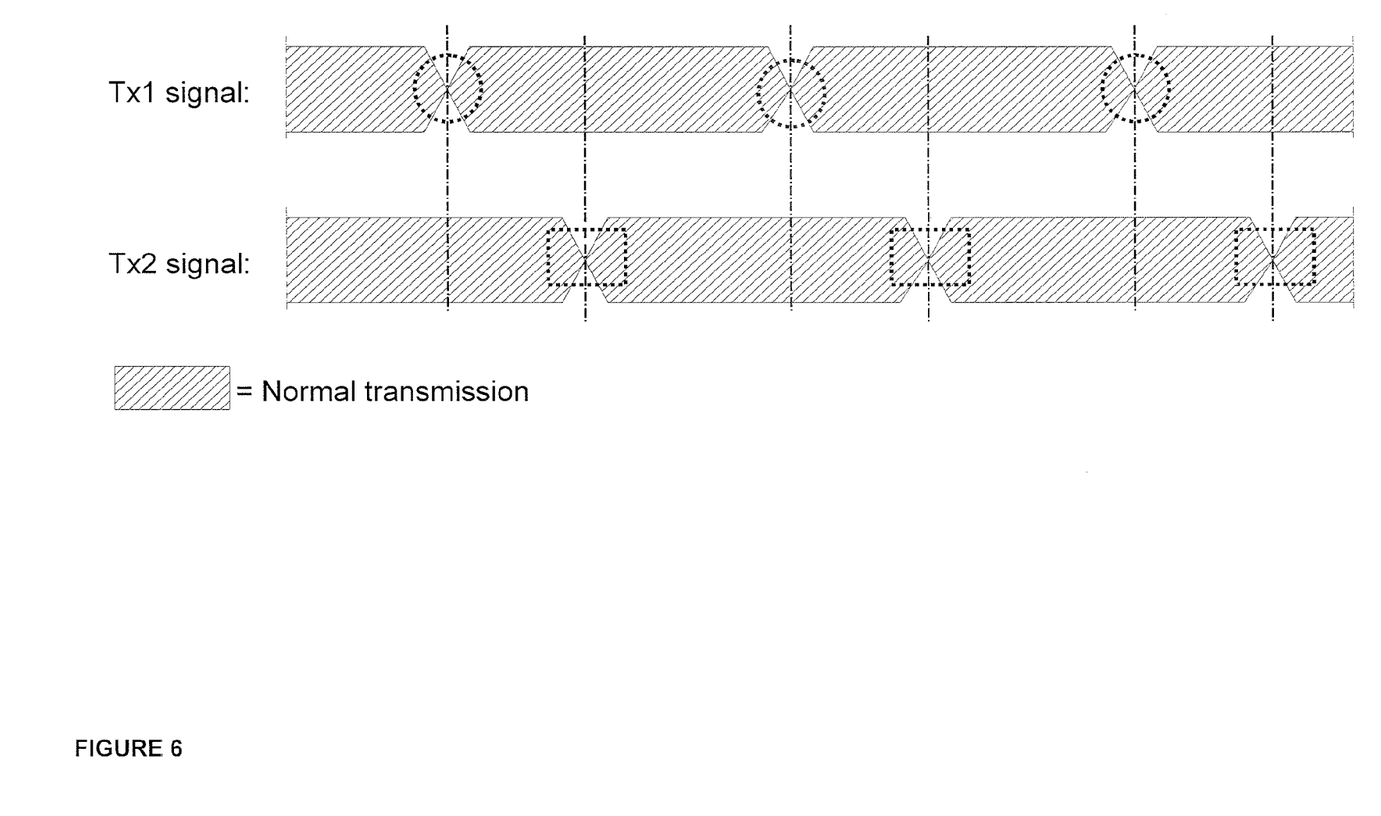
FIG. 6 is a graphical representation of an example of transmission timing which may be utilized by the system of FIG. 3, according to some of the example embodiments.

FIG. 6 illustrates an example of embedding in a predetermined rate or known pattern. As shown in FIG. 6, the TX1 signal is periodically embedded with a zero amplitude differential phase tracking signal in the regions marked by a dashed circle. It should be appreciated that in some example embodiments different transmitted signals may be embedded with the zero amplitude differential phase tracking signal during different periods of transmission. For example, as shown in FIG. 6, the TX2 signal is embedded with the zero amplitude differential phase tracking signal (in the regions marked by a dashed square) at different transmission times than the embedding of the TX1 signal.

Operation 152:

The operation of embedding 151 may further comprise the transmitter 55 embedding 152 the zero amplitude differential phase tracking signal 56 in a Multiple-Input-Multiple-Output (MIMO) wireless communication signal 51 respectively. The embedding 152 may be performed by the processor 65 and/or the embedding unit 67.

Operation 153:

The operation of embedding 151 may further comprise the transmitter 55 embedding 153 the zero amplitude differential phase tracking signal 56 in a Multiple-Input-Multiple-Output (MIMO) wireless communication signal 51, the MIMO wireless communication signal 51 being separable with respect to polarization or spatial characteristics. The embedding 153 may be performed by the processor 65 and/or the embedding unit 67.

Operation 154:

Example operations may also comprise the transmitter 55 sending 154 the wireless communication signal 51, comprising the embedded differential phase tracking signal 56, to a receiver 60, respectively. A communications port 61, of the transmitter 55, may be configured to send the wireless communications signal 51, comprising the embedded zero amplitude differential phase tracking signal 56.

Operation 155:

Some example operations may take place within the receiver 60. Example operations may comprise the first receiver port 69 of the receiver system 60 receiving 155 the wireless communication signal 51, the wireless communication signal 51 comprising the embedded differential phase tracking signal 56. If the embedded differential phase tracking signal 56 comprises a 'zero amplitude,' the first receiver port 69 of the receiver 60 may only receive interference components 58a. The interference is provided from the transmission of a reference communication signal 53 being transmitted from a transmitter 57 resulting in a transmitted reference signal 58 and interference components 58a.

It should be appreciated that receiving 155 the wireless communication signal 51/56 may further comprise receiving the wireless communication signal 51/56 with the embedded differential phase tracking signal 56 comprising known signal characteristics. In some example embodiments, the known signal characteristics may be a zero amplitude.

In some example embodiments, the wireless communication signal 51 may be a MIMO wireless communication signal. In some example embodiments the wireless communication signal 51 may be a MIMO wireless communication signal being separable with respect to polarization or spatial characteristics.

Operation 157:

Example operations may comprise the second receiver port 73 receiving 157 a wireless reference communication signal 58, the wireless reference communication signal 58 being distinct from the wireless communication signal 51/56. In some example embodiments, the step of receiving 157 may comprise receiving the wireless reference communication signal 58 with unknown signal characteristics or from an unknown origin.

Figure 7:
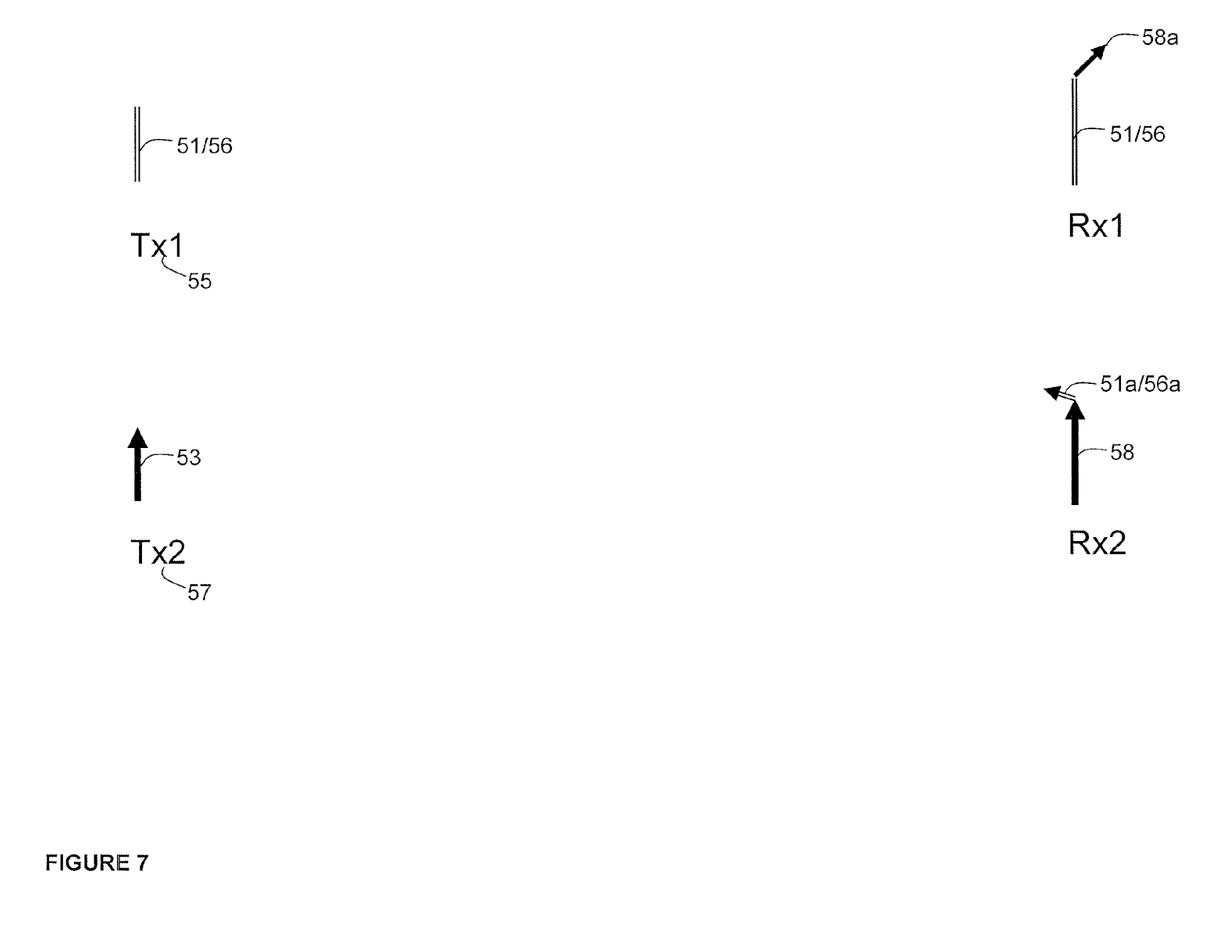
FIG. 7 is an illustrative example of signals which may be received by the system of FIG. 3, according to some of the example embodiments.

FIG. 7 illustrates an example of the transmitted and received signals. In FIG. 7, the wireless communication signal 51 embedded with the zero amplitude differential phase tracking signal 56 is represented by double vertical lines. In the example provided by FIG. 7, the differential phase tracking signal 56 is a 'zero signal' which may not be detected. Thus, first receiver port 69 of the receiver 60 may receive the interference component 58a. The received interference component 58a may comprise a different phase and amplitude with respect to the transmitted signal 58. The second receiver port 73 may receive the transmitted signal 58 since the interference component 51a/56a may be in the form of a zero interference signal.

Operation 159:

As shown in FIG. 3, each receiver port 69 and 73 may comprise a local oscillator 71 and 75, respectfully. In the removing of the interference component, the differential phase angle between the two receiver oscillators should be estimated. Thus, example operations may also comprise the receiver 60 adjusting 159 an estimate of a differential phase angle between two receiver oscillators 71 and 75 based on a differential phase angle measurement between the wireless communication signal 51/56 and the wireless reference signal 58. An adjustment unit 83 may be configured to adjust the estimate of the differential phase angle.

Operation 161:

In the example operation of adjusting 159, some example operations may comprise the receiver 60 determining 161 a phase difference between interference components in the received wireless communication signal 51/56 and the wireless reference communication signal 58. The operation of determining 161 may be performed by the adjustment unit 83.

In determining the phase difference between the interference components, the received signals 51/56 and 58 may be filtered with the use of adaptive filters 77 and 79, respectively. Upon filtering, the received wireless reference signal 58 may be rotated with the use of a rotating element 85. Upon rotation, the signals are thereafter combined with the use of a combining element 87, where the wireless communication signal 51/56 (comprising the interference component 58a) is added while the rotated wireless reference communication signal 58 is subtracted.

In the example provided, where the differential phase tracking signal comprises a 'zero amplitude,' the received wireless communication signal 51/56 may solely comprise the interference component 58a. Thus, the resulting combination should yield a 'zero amplitude' signal if the wireless reference communication signal 58 has been rotated and filtered accordingly. Assuming filters are in steady state or otherwise converged, since the output after summation 87 is known (e.g., a zero amplitude sample), the differential phase including filtering can easily be calculated from the phase of the wireless communication signal and the phase of the wireless reference signal. It should be appreciated that the filters may be configured to slowly adjust to remove any systematic slow effects from transmitters, receivers, and the physical propagation channel.

The slicer/demapper 89 may be configured to receive an I/Q sample and try to find the closest constellation point in the transmitted constellation. Once it locates this point, the slicer/demapper 89 may compute the difference between the point and the sample, this is the error signal.

Thus, based on the value of the resulting combined signal, the phase difference between oscillators 71 and 75 may be estimated and necessary adjustments may be provided.

Operation 163:

Example operations may also comprise the receiver 60 suppressing 163 the interference (e.g., component 58a) in the wireless communication signal 51 using the wireless reference communication signal 58 and the estimate of the differential phase angle, as explained in operation 161. It should be appreciated that in some example embodiments the combining element or suppression unit 87 may be configured to perform the suppression.

Operation 164:

Example operations may further comprise interpolating a future value of the estimate of the differential phase noise between the two receiver oscillators. The operation of interpolating may be performed by the adjustment unit 83 and/or an interpolation unit 91.

The example operation of interpolating may further comprise the receiver buffering, via a delay unit D, the wireless communication signal and the wireless reference signal and combining the wireless communication signal and the wireless reference after a delayed period of time. By delaying the combination a future value of the differential phase estimation may be obtained.

Figure 8:
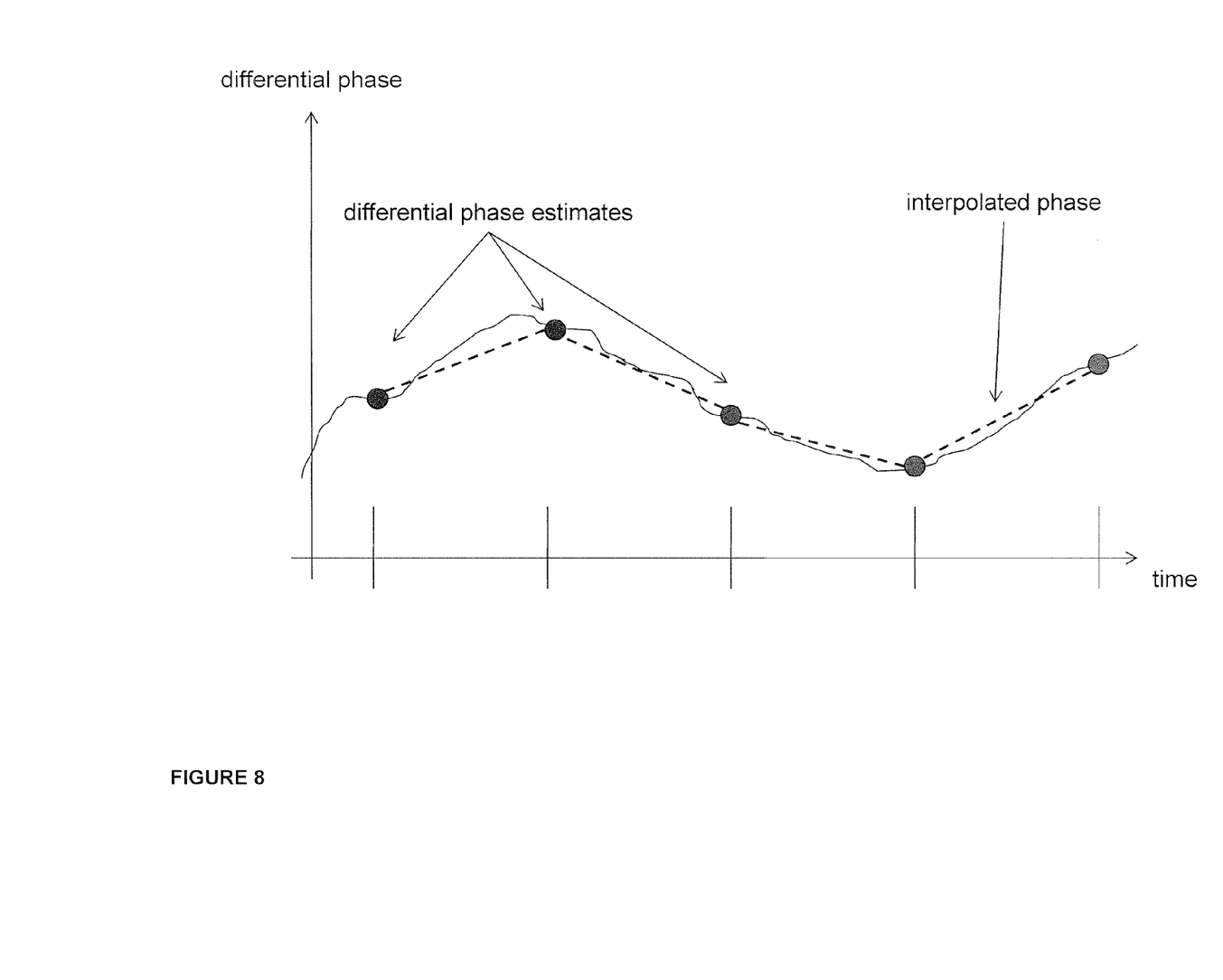
FIGS. 8 and 9 are graphical examples depicting differential phase estimation and interpolation, according to some of the example embodiments.

FIG. 8 illustrates a graphical example of differential phase estimation and interpolation. In FIG. 8, the circled points represent differential phase estimates, the dashed line represents interpolated estimations between measurements, and the solid line represents the actual differential phase. The interpolation of the differential phase estimate may take place between two estimated differential phase estimates. The greater the number of differential phase estimates, the more precise the interpolated phase estimation may be. The number of differential phase estimations which may be made may depend on system characteristics (e.g., bandwidth and frequency).

Figure 9:
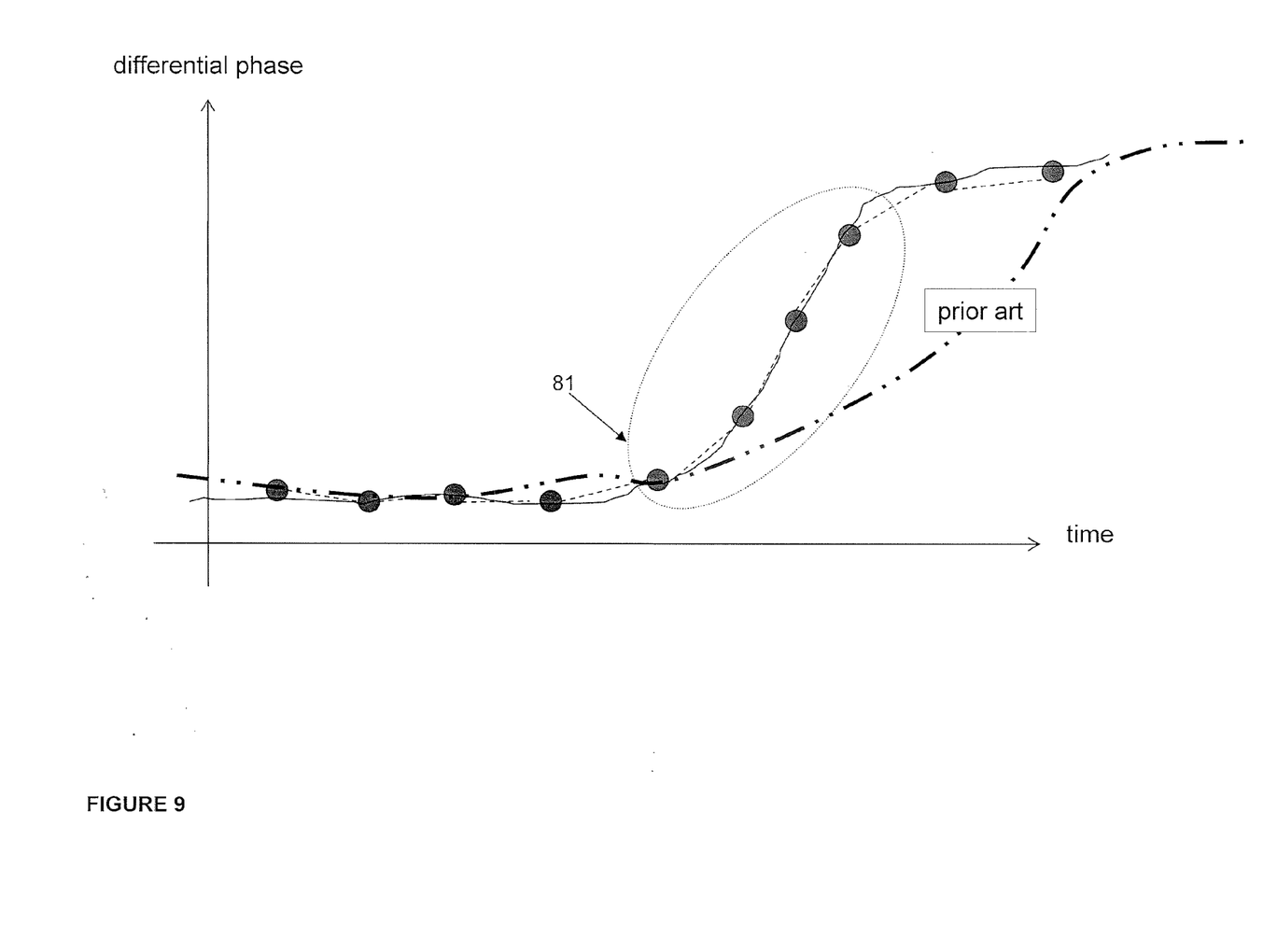

Thus, using the example embodiments disclosed herein, interference cancellation may be provided with the use of improved differential phase estimation techniques. The example embodiments provide high precision differential phase estimates without the use of expensive hardware of complex signal processing. FIG. 9 illustrates differential phase estimation and interpolation according to some of the example embodiments in comparison to the estimation and interpolation according to standard correlator-based methods. In FIG. 9, the circled points represent differential phase estimates, the dashed line represents interpolated estimations between measurements, and the solid line represents the actual differential phase. As illustrated, by increasing the number of differential phase measurements (e.g., by increasing the number of times the estimations are made or through the use of buffering) the overall differential phase estimation may closely track the actual differential phase, even in instances where the differential phase may rapidly change. In contrast, standard methods provide poor tracking abilities with rapidly changing differential phases. As shown in FIG. 9, point 81 represents a sharp increase in the differential phase. The standard methods are generally not capable of tracking such exponential changes.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, in a transmitter, for interference suppression of wireless communication signals, the method comprising:
embedding a zero amplitude differential phase tracking signal, utilized by a receiver for interference suppression corresponding to a differential phase angle between two receiver oscillators, in a wireless communication signal, the embedding being performed in a known pattern; and
sending the wireless communication signal having the embedded differential phase tracking signal to the receiver, wherein the wireless communication signal is separable with respect to polarization or spatial characteristics.

2. The method of claim 1, wherein the embedding comprises embedding the zero amplitude differential phase tracking signal in a Multiple-Input-Multiple-Output (MIMO) wireless communication signal.

3. The method of claim 2, wherein the MIMO wireless communication signal is separable with respect to polarization or spatial characteristics.

4. A method, in a receiver, for interference suppression of wireless signals, the method comprising:
receiving a wireless communication signal, the wireless communication signal being separable with respect to polarization or spatial characteristics and comprising an embedded differential phase tracking signal;
receiving a wireless reference signal that is distinct from the wireless communication signal;
adjusting an estimate of a differential phase angle between two receiver oscillators based on a differential phase angle measurement between the wireless communication signal and the wireless reference signal; and
suppressing interference corresponding to the differential phase angle between the two receiver oscillators in the wireless communication signal using the wireless reference signal and the estimate of the differential phase angle.

5. The method of claim 4, wherein the adjusting the estimate of the differential phase angle comprises determining a phase difference between interference components in the received wireless communication signal and the wireless reference signal.

6. The method of claim 4, wherein the receiving a wireless reference signal comprises receiving the wireless reference signal with at least one of unknown signal characteristics and from an unknown origin.

7. The method of claim 4, wherein the receiving the wireless communication signal comprises receiving a Multiple-Input-Multiple-Output (MIMO) wireless communication signal comprising the embedded differential phase tracking signal.

8. The method of claim 7, wherein the MIMO wireless communication signal is separable with respect to polarization or spatial characteristics.

9. The method of claim 4, wherein the receiving the wireless communication signal comprises receiving the wireless communication signal comprising the differential phase tracking signal with known signal characteristics.

10. The method of claim 4, wherein the receiving the wireless communication signal comprises receiving a first wireless communication signal comprising a zero amplitude differential phase tracking signal.

11. The method of claim 4, further comprising interpolating values of the estimation of the differential phase angle up to an estimation rate higher than a rate of the embedded differential phase tracking signal.

12. The method of claim 4, further comprising interpolating a future value of the estimate of differential phase noise between the two receiver oscillators.

13. The method of claim 12, wherein the interpolating comprises:
buffering the wireless communication signal and the wireless reference signal;
combining the wireless communication signal and the wireless reference signal after a delayed period of time.

14. A transmitter for sending wireless communication signals, the transmitter comprising:
an embedding circuit configured to embed, in a wireless communication signal and at a predetermined rate, a zero amplitude differential phase tracking signal utilized by a receiver for interference cancellation corresponding to a differential phase angle between two receiver oscillators; and
a communications port configured to send the wireless communications signal, comprising the embedded zero amplitude differential phase tracking signal, to the receiver, wherein the wireless communication signal is separable with respect to polarization or spatial characteristics.

15. The transmitter of claim 14, wherein the wireless communications signal is a Multiple-Input-Multiple-Output (MIMO) wireless communication signal.

16. A receiver configured to receive wireless communication signals, the receiver comprising:
a first communications port configured to receive a wireless communication signal, the wireless communication signal being separable with respect to polarization or spatial characteristics and comprising an embedded differential phase tracking signal;
a second communications port configured to receive a wireless reference signal that is distinct from the wireless communication signal;
an adjustment circuit configured to adjust an estimate of a differential phase angle between two receiver oscillators based on a differential phase angle measurement between the wireless communication signal and the wireless reference signal; and
a suppression circuit configured to suppress an interference corresponding to the differential phase angle between the two receiver oscillators in the wireless communication signal using the wireless reference signal and the estimate of the differential phase angle.

17. The receiver of claim 16, wherein the adjustment circuit is configured to adjust the estimate of the differential phase angle by determining a phase difference between interference components in the received wireless communication signal and the wireless reference signal.

18. The receiver of claim 16, wherein the wireless reference signal has at least one of unknown signal characteristics and is from an unknown origin.

19. The receiver of claim 16, wherein the wireless communication signal is a Multiple-Input-Multiple-Output (MIMO) wireless communication signal comprising the embedded differential phase tracking signal.

20. A computer program product stored in a non-transitory computer readable medium for interference suppression of wireless signals, the computer program product comprising software instructions which, when run on one or more processing circuits of a receiver, causes the receiver to receive a wireless communication signal, the wireless communication signal being separable with respect to polarization or spatial characteristics and comprising an embedded differential phase tracking signal;

receive a wireless reference signal that is distinct from the wireless communication signal;

adjust an estimate of a differential phase angle between two receiver oscillators based on a differential phase angle measurement between the wireless communication signal and the wireless reference signal; and suppress interference corresponding to the differential phase angle between the two receiver oscillators in the wireless communication signal using the wireless reference signal and the estimate of the differential phase angle.

21. The method of claim 1, wherein the zero amplitude differential phase tracking signal is used by a receiver to suppress interference associated with oscillator phase noise.

22. The method of claim 1, wherein the known pattern is at a predetermined rate.

23. The method of claim 4, wherein the embedded differential phase tracking signal is embedded in the wireless communication signal at a predetermined rate.

24. The transmitter of claim 14, wherein the embedded zero amplitude differential phase tracking signal is used by a receiver to suppress interference associated with oscillator phase noise.

* * * * *